June 21, 1932.  J. R. LUNDBERG  1,864,208
ICE CUTTER FOR WINDSHIELDS
Filed March 13, 1931
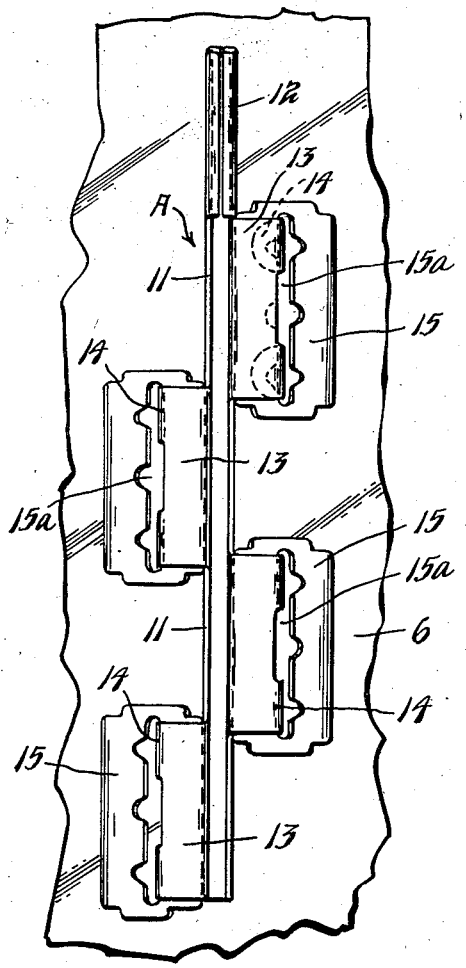
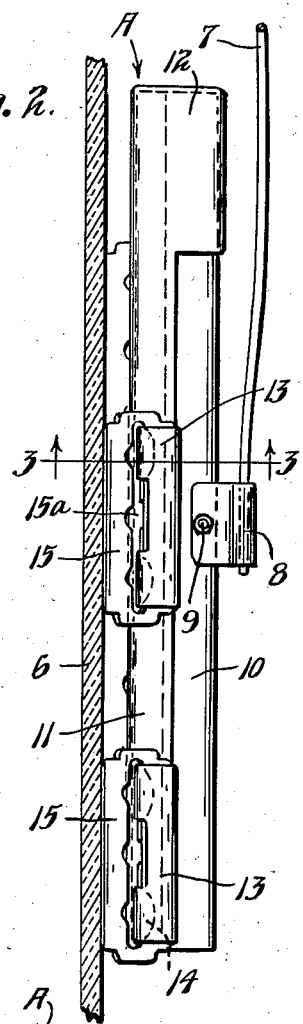
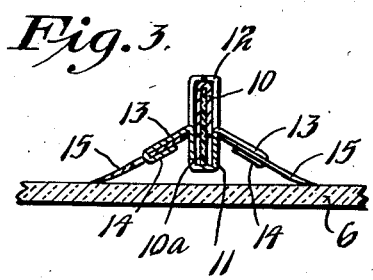
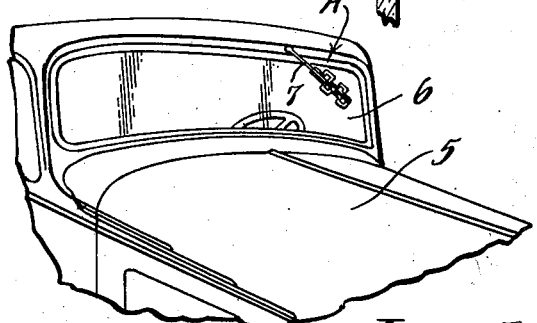
Inventor
John Ruben Lundberg
By his Attorneys
Williamson & Williamson Patented June 21, 1932

1,864,208

UNITED STATES PATENT OFFICE

JOHN RUBEN LUNDBERG, OF MINNEAPOLIS, MINNESOTA

ICE CUTTER FOR WINDSHIELDS

Application filed March 13, 1931. Serial No. 522,261.

This invention relates to ice cutters for use in cutting away the ice and snow that may form on the windshield of an automobile or other vehicle.

At the present time, most automobiles are equipped with windshield wipers which work over the windshield in front of the driver of the automobile and these windshield wipers in rainy weather, when the temperature is above freezing, act quite satisfactorily to remove the rain from the windshield so that the view of the driver will not be obscured. Under certain weather conditions, however, particularly when the temperature is slightly below the freezing point, when rain, snow or sleet falls, it is found that the rain, snow or sleet will freeze to the windshield, thereby rendering the usual windshield wiper ineffective to clean the windshield. It is desirable when such conditions occur to have at hand an ice cutter which can be quickly applied to the ordinary windshield wiper and which can be effectively used to cut away the ice and snow that continually forms on the windshield.

It is, therefore, an object of the present invention to provide a novel and improved ice cutter for windshields, which can be readily and quickly attached to an ordinary windshield wiper and which will be effective to remove any ice or snow that may accumulate on the windshield.

It is another object to provide an ice cutter for windshields including as the cutting elements a number of ordinary safety razor blades which are always readily accessible and can be readily replaced if necessary.

To these ends, the invention consists in the novel parts and novel combinations of parts hereinafter defined in the claims and described in the following specification, made in connection with the accompanying drawing, wherein like reference characters refer to the same or similar parts throughout the various views, and in which, Fig. 1 is a perspective view of a portion of an automobile, which automobile is equipped with a windshield wiper of standard construction and an ice cutter embodying the present invention;

Fig. 2 is a vertical section taken through the windshield of the automobile illustrated in Fig. 1 and showing the windshield wiper together with the ice cutter of the present invention in side elevation;

Fig. 3 is a horizontal section taken on the line 3—3 of Fig. 2, as indicated by the arrows; and Fig. 4 is a view in front elevation of the ice cutter applied against a portion of the windshield and disassociated from the windshield wiper.

Referring to the drawing, portions of an automobile 5 are illustrated, the windshield of the automobile being designated by the numeral 6. In accordance with the usual practice, a windshield wiper for the automobile is provided and this wiper, in pursuance to standard construction, is supported by a spring wire or rod 7 which may be supported above the windshield 6 and oscillated by any suitable means (not illustrated) for travel over the forward side of the windshield 6 in front of the driver of the automobile. A bracket 8 is carried by the rod 7 at its lower end and this bracket carries a stud 9 to which the windshield wiper 10 is pivoted. The wiper 10 includes a channel-shaped member having its open end extending rearwardly and within the channel of which one or more rubber strips 10a is held. Under normal circumstances, the rear edge of the strip 10a is pressed into engagement with the windshield 6 by the resilient rod 7 or equivalent means.

In accordance with the present invention, an ice cutter designated as an entirety by the letter A is provided and this ice cutter is capable of being releasably attached to the wiper 10. The ice cutter A includes a channel-shaped member 11 which is of approximately the same length as the wiper 10 and the channel of this member is of such size as to receive the strip 10a and the rear portions of the sides of the channel-shaped member of the wiper 10. The upper end of the member 11 is closed and is provided with forwardly extending and bent portions forming a small housing 12 which embraces the entire upper end of the wiper 10 to enclose the same. This housing 12 serves to retain the ice cutter A on the wiper 10 and at the same time it permits the ice cutter to be quickly applied to or removed from the wiper. A plurality of wings 13 extend laterally and rearwardly from the forward edges of the U-shaped member 11 and these wings are disposed in staggered relation from the bottom of the member 11 to the housing 12 and extend alternately from opposite sides of the member 11. Each wing 13 has two or more tabs 14 which are reversely bent back onto the wings or adjacent thereto. A plurality of ordinary safety razor blades 15 are provided and these blades are formed of thin flexible steel and have, at least, one sharpened edge. Each blade 15 has one or more perforations cut therethrough or a slot 15a and the tabs 14 are extended through the perforations or slots of the various blades. Each wing 13 and the tabs 14 formed thereon, form a clip for supporting one of the blades 15. To attach a blade to one of the clips, the tabs 14 of the clip will be bent and inserted through the slot 15a of the blade and then reversely bent relative to the wing 13 to bear against the rear side of the blade as best illustrated in Fig. 3. Of course, a sharpened edge of each blade 15 will be disposed rearwardly and outwardly relative to the wing 13 to which it is attached.

With the construction provided, the sharpened edges of the various blades 15, when the ice cutter A is applied to the wiper arm 10, will bear against the windshield 6 as best shown in Fig. 3. As the safety razor blades 15 are quite flexible, they will assume the curved shape shown in Fig. 3, due to the resiliency of the rod 7 or equivalent spring pressing means of the wiper. The blades and particularly the sharpened rearwardly projecting edges thereof will extend at sharp acute angles relative to the windshield 6. As the windshield wiper with the ice cutter mounted thereon is oscillated, the sharpened edges of the blades 15 will cut away all ice and snow that may have accumulated on the forward side of the windshield. As the wiper is oscillated in one direction, the blades at one side of the ice cutter will be first advanced to cut spaced paths through the ice and as the wiper is oscillated in the opposite direction, the blades at the other side of the ice cutter will cut away the remaining ice lying between the paths previously cut. The use of a plurality of short blades disposed in staggered relation at opposite sides of the ice cutter permits proper contact of blades with all portions of the windshield in the path of the wiper even though the windshield does not form a true plane surface and even though different portions of the rear edge of the member 11 are spaced varying distances from the windshield. The flexibility of the blades 15 maintains the cutting edges of the blades in constant contact with the windshield through the agency of the spring rod 7 or its equivalent. It will be seen that the ice cutter can be very quickly applied to the wiper arm 10 and removed therefrom as occasion demands, and yet a standard wiper arm may be used which will at all times be effective when the ice cutter is not applied to the same.

It will, of course, be understood that various changes may be made in the form, details, arrangement and proportions of the various parts without departing from the scope of the present invention as claimed.

The ice cutter of the invention is exceedingly simple in construction and has been found to be successful for the purposes intended in actual operation. It will be seen that readily accessible safety razor blades of standard construction may be employed and that these blades may be replaced from time to time as becomes necessary.

What is claimed is:—

1. For use with a windshield wiper mounted for oscillatory movement over a windshield, a casing member having an open bottomed housing at its upper portion adapted to be hooked over the upper end of said wiper, said casing member having a lower portion adapted to fit against said wiper and a blade secured to said casing member and having a sharpened edge adapted to bear against said windshield, the sharpened edge of said blade being mounted to extend at an acute angle to the windshield.

2. For use with a windshield wiper mounted for oscillatory movement over a windshield, a channel-shaped member within which a portion of said wiper is adapted to be received, said channel-shaped member having an upper end forming a housing which is open at its lower end to completely embrace the upper end of said wiper and removably retain said channel-shaped member in place thereon and a blade carried by said channel-shaped member and having a sharpened edge adapted to contact the windshield.

3. An ice cutter for application to a windshield wiper, comprising a channel-shaped supporting member within which a portion of the wiper is adapted to be received, means carried by said supporting member for embracing all portions of the upper end of the wiper and blades carried by said supporting member and extending diagonally laterally and rearwardly therefrom relative to a wiper when the ice cutter is applied thereto.

4. An ice cutter for windshields, comprising a channel-shaped member adapted to receive a portion of a windshield wiper within the channel thereof, a housing at the upper end of said member adapted to embrace the upper end of the wiper to releasably maintain the member in place thereon, wings projecting from the sides of said member in staggered relation from the two sides thereof, said wings having reversely bent tabs and said wings being inclined diagonally laterally and rearwardly from said member relative to a wiper when the ice cutter is applied thereto, and slotted blades supported from said wings, the tabs of said wings projecting through the slots of said blades, said blades having sharpened outer edges adapted to contact the windshield.

In testimony whereof I affix my signature.

JOHN RUBEN LUNDBERG.